(12) United States Patent
Pearse et al.

(10) Patent No.: US 7,211,727 B2
(45) Date of Patent: May 1, 2007

(54) MODULAR STRAP ASSEMBLY FOR MOUNTING WIRING MODULES

(76) Inventors: James N. Pearse, deceased, late of Libertyville, IL (US); by James Pearse, legal representative, 921 Hawthorne La., Libertyville, IL (US) 60048; Paul Kadar, 4038 Chestnut St., Seaford, NY (US) 11783

( * ) Notice: Subject to any disclaimer, the term of this patent is extended or adjusted under 35 U.S.C. 154(b) by 0 days.

(21) Appl. No.: 11/313,736

(22) Filed: Dec. 22, 2005

(65) Prior Publication Data

US 2006/0207782 A1    Sep. 21, 2006

Related U.S. Application Data

(60) Provisional application No. 60/640,496, filed on Dec. 30, 2004.

(51) Int. Cl.
*H01H 23/04* (2006.01)

(52) U.S. Cl. .......................... 174/53; 174/481; 174/57; 174/58; 220/3.2; 220/3.3; 439/536

(58) Field of Classification Search ................ 174/50, 174/480, 481, 58, 57, 53, 66, 67; 220/3.2–3.9, 220/4.02, 241, 242; 439/535, 536; 248/906; 361/728, 729, 730, 731, 732; D13/162, 158, D13/146
See application file for complete search history.

(56) References Cited

U.S. PATENT DOCUMENTS

| | | | | |
|---|---|---|---|---|
| 1,717,871 A | * | 6/1929 | Both ......................... 220/241 |
| 3,735,020 A | * | 5/1973 | Licata ......................... 174/66 |
| 4,165,443 A | * | 8/1979 | Figart et al. ................... 174/53 |
| 4,612,412 A | * | 9/1986 | Johnston ........................ 174/57 |
| 4,631,354 A | * | 12/1986 | Boteler ......................... 174/66 |
| 4,725,249 A | * | 2/1988 | Blackwood et al. ........ 439/535 |
| 4,894,024 A | * | 1/1990 | Debortoli et al. ........... 439/535 |
| 5,178,350 A | * | 1/1993 | Vink et al. ................... 248/906 |
| 5,189,259 A | * | 2/1993 | Carson et al. ................ 174/66 |
| 5,190,479 A | * | 3/1993 | Jordi ......................... D13/146 |
| 5,500,487 A | * | 3/1996 | Leon ............................. 174/53 |
| 5,696,350 A | * | 12/1997 | Anker .......................... 174/66 |
| 5,700,978 A | * | 12/1997 | Huff ............................. 174/66 |
| 5,723,817 A | * | 3/1998 | Arenas et al. ................ 174/66 |

\* cited by examiner

*Primary Examiner*—Angel R. Estrada
(74) *Attorney, Agent, or Firm*—Paul J. Sutton

(57) ABSTRACT

The present invention overcomes the deficiencies with respect to the prior art devices by providing a plurality of straps joined together with frangible members which can be separated to form a gang of one or more straps which are coupled together for mounting wiring modules to wall boxes. The number of straps in a gang of straps used to couple the wiring modules to the wall boxes is determined by the number of wall boxes that are being used. Each strap of the present invention has a single opening defined by two side members where each side member has projections interposed with recesses for capturing and holding a wiring module. The modular strap accurately positions, aligns and locates all of the wiring modules relative to each other and positions them to a flat plane.

8 Claims, 2 Drawing Sheets

MODULAR STRAP ASSEMBLY FOR MOUNTING WIRING MODULES

This application claims the benefit of the filing date of provisional application having Ser. No. 60/640,496 which was filed on Dec. 30, 2004.

BACKGROUND OF THE INVENTION

1. Field of the Invention

The present invention relates generally to the field of wiring devices installed in a box mounted in a building wall and more particularly to a gang of straps which are selectively separated for mounting electrical wiring modules to one or more wall boxes in a building wall.

2. Description of the Prior Art

At the present time when it is desired to modify the wiring in an existing building, whether public, commercial or residential by adding a wiring module such as a switch, a receptacle, a telephone jack, etc., it is necessary to cut a hole in a wall of the building, install a box within the hole, attach the box to a stud and install the wiring module or modules into the box. In new construction, the box is attached to a stud of an open wall and, thereafter, the wall, which may be sheet rock having an opening for access to the box, is placed over the studs. The box is empty for receiving such wiring modules and provides pairs of mounting ears for mounting each strap of the wiring modules to the box.

The wall box selected is sized to accept all the wiring modules required at that location and the number of pairs of mounting ears on the box is equal to the number of straps needed for holding the wiring modules which the box can receive. Once a wiring module is connected, the strap for the wiring module is screwed to at least one pair of ears to mount the wiring module in and to the box. The process of connecting a wiring module to various conductors and then attaching the strap of the wiring module to the box is done for each wiring module located within the box. Thereafter, a wall plate is positioned over the wiring modules in the box. In many instances, a single box will contain two wiring modules positioned one above the other and, when wall boxes are ganged together, the wiring modules will also be positioned side by side. In installations where there are multiple wiring modules in multiple boxes positioned side by side, the wiring modules must be aligned with each other, must be positioned parallel to each other and must be spaced from each other by a distance dictated by the spacing between the openings in the cover plate before the wall plate can be installed. In addition, misalignment and positioning problems are caused by boxes that are skewed relative to the wall, by walls that are not flat, or by wiring modules that are not flat against the wall. A wall plate having suitable openings, normally a separate opening for the wiring modules of a single strap, is installed over the wiring modules after all of the wiring devices are finally positioned relative to each other.

SUMMARY OF THE INVENTION

The present invention overcomes the deficiencies with respect to the prior art devices by providing a plurality of straps joined together with frangible members which can be separated to form a gang of one or more straps which are coupled together for mounting wiring modules to wall boxes. The number of straps in a gang of straps used to couple the wiring modules to the wall boxes is determined by the number of wall boxes that are being used. The conventional difficulties encountered with respect to mounting and visually positioning a plurality of wiring modules to wall boxes and then attaching a wall plate to the straps are overcome with the use of the modular strap of the present invention. Such difficulties have included attempting to position the wiring modules to be in alignment with each other, attempting to position the wiring modules to be parallel to each other, attempting to adjust the spacing between the different modules to be relatively equal and uniform and attempting to fix all of the modules to be flat against the wall. Each strap of the present invention has a single opening defined by two side members where each side member has projections interposed with recesses for capturing and holding a wiring module. The modular strap accurately positions, aligns and locates all of the wiring modules relative to each other and positions them to a flat plane.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
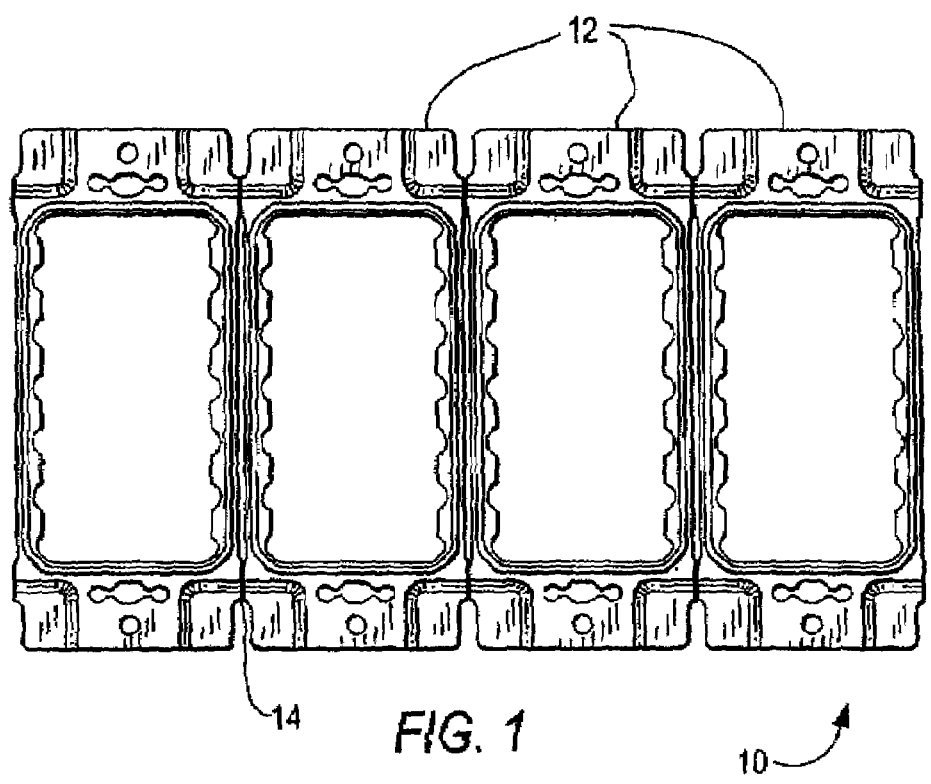
FIG. 1 is a plan view of a gang of four straps for mounting wiring modules to four wall boxes ganged together.

Referring to FIG. 1, there is shown modular strap assembly 10 comprised of a plurality of straps 12 connected together with fungible connecting members 14. The straps 12 can be composed of a rigid or semi-rigid polymer material which, when bent back upon itself a few times, will break the fungible member to permit adjacent straps to be separated from each other.

Figure 2:
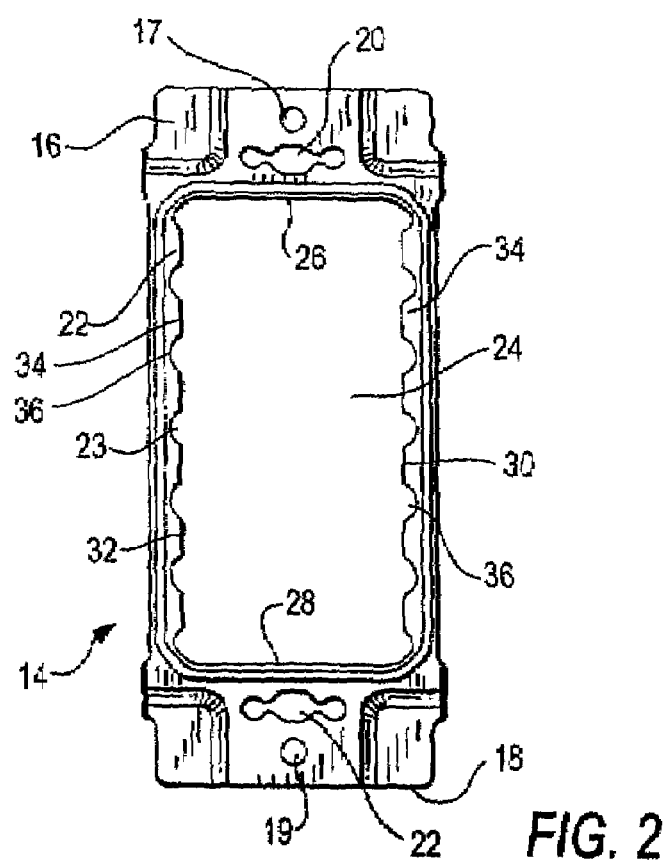
FIG. 2 is a plan view of a single strap which was separated from a plurality of straps.

Referring to FIG. 2, there is shown a front view of strap 14 for mounting wiring modules. The strap has upper 16 and lower 18 flanges each of which includes mounting apertures 20, 22 for receiving mounting screws for coupling the strap to the ears of a wall box. The upper and lower flanges also includes apertures 17, 19 which may be threaded for receiving fastening means such as screws to hold a wall plate to the strap. The strap 12 includes an opening 24 defined by upper and lower edges 26, 28 and side edges 30, 32. Each side edge supports a plurality of evenly spaced projection 34 which project into the opening 24. Located between adjacent projections 34 are recesses 36. The opening 24 in combination with the projections 34 and recesses 36 which project into the opening 24 are for receiving and securely holding at least one wiring module.

Figure 3:
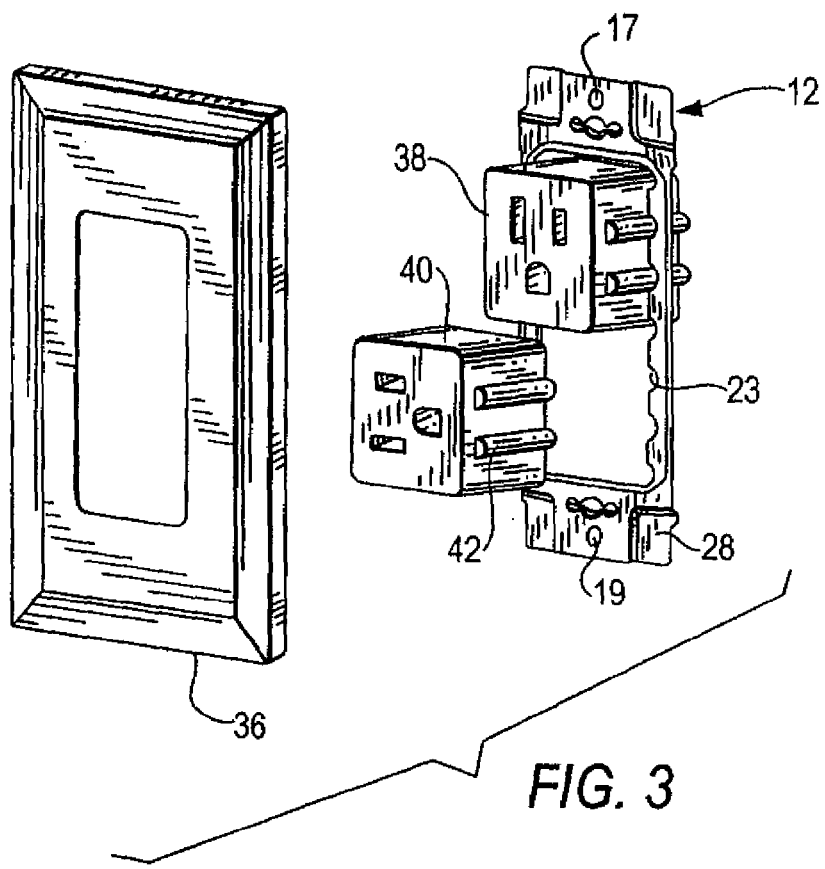
FIG. 3 is an exploded perspective view of a single strap with wiring modules and a wall plate.

Looking at FIG. 3, there is shown an exploded perspective view of a wall plate 36, wiring modules 38, 40 and strap 12. The wiring modules can be for similar or different functions such as a receptacle for 120 or 240 volts, a telephone jack, a computer jack and the like. The wiring modules can be oriented, relative to the strap 12, to be mounted either vertically or horizontally, depending on the application which is desired by the user. In FIG. 3, wiring module 38 is mounted vertically and wiring module 40 is mounted horizontally.

Figure 4:
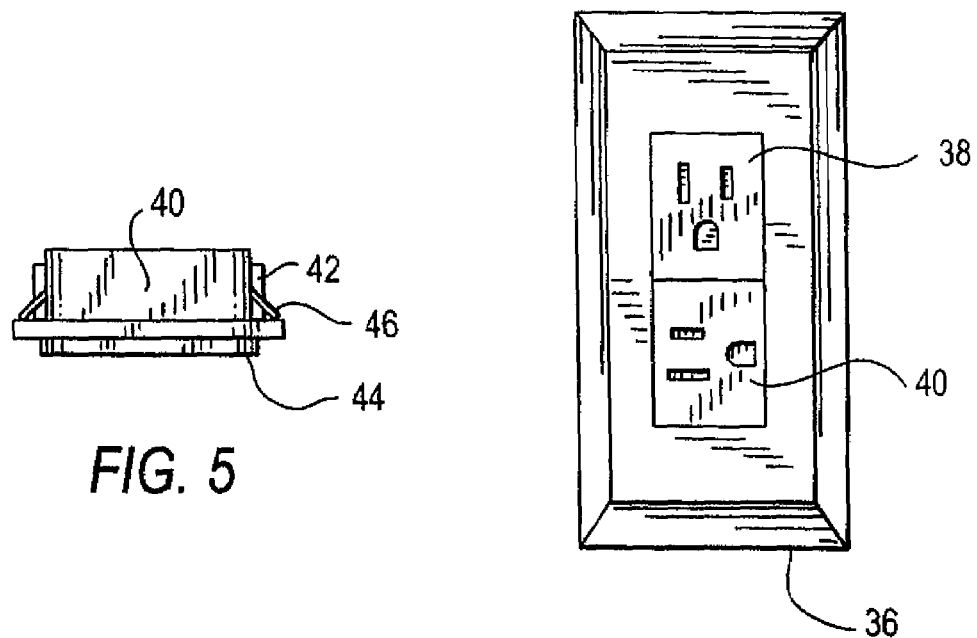
FIG. 4 is a front view of a wall plate positioned around wiring modules.

The wiring modules 38, 40 support outwardly projecting ribs 42 on each side surface which are slidably received by recesses 36 in the side edges of the strap. Thus, the wiring modules can be rotated either clockwise or counter-clockwise prior to being inserted into the strap to allow the wiring devices to be oriented either vertically or horizontally. As shown in FIG. 4, the top wiring device is oriented to be vertical and the bottom wiring device is oriented to be horizontal. Two screws (not shown) which pass through openings in the wall plate and thread into apertures 17, 19 in the strap, couple the wall plate to the strap.

Figure 5:
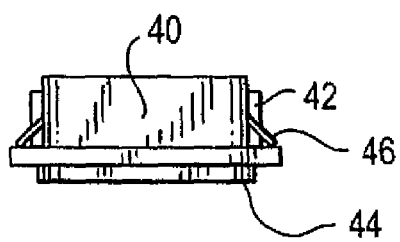
FIG. 5 is a top view of a wiring module in a strap.

Referring to FIG. 5, there is shown a top view of a method of locking a wiring module to the strap. The wiring module 40 has, adjacent its front face, a thin flange 44 which extends around the wiring module and connects the ends of the outwardly projecting ribs 42. As the wiring module is inserted into the strap, the back of the flange 44 contacts projections 34 on the side edges of opening 24 of the strap and is prevented from sliding further into the strap. To lock the wiring module to the strap, yieldably extending projections 46 which extend outward from the wiring module and angled toward the front of the wiring module are provided. In operation, as the wiring module is inserted into the strap, just prior to the back surface of the flange 44 contacting the ends of the strap, the yieldable extending projections 46 move behind the strap and snap outward to engage the back surface of the strap to lock the wiring module to the strap.

With this invention, one or more straps can be connected to provide multiple gangs for attaching wiring modules to multiple wall boxes. When the straps are used in multiple gangs, they provide an even mounting surface for the wall plate, even when the walls are uneven. In addition, the modular strap can compensate for wall boxes that are mounted at different heights and can ensure flush and even placement of all electrical modular wiring devices ganged together.

As is readily recognized, there is provided in accordance with the invention, a flexible mounting assembly for modular electrical wiring devices of a variety of types. In use, the installer can snap one or more straps from a plurality of straps of eight or more in accordance with the requirements of the job.

While there have been shown and described and pointed out the fundamental novel features of the invention as applied to the preferred embodiment, it will be understood that various omissions and substitutions and changes of the form and details of the method and apparatus illustrated and in the operation may be done by those skilled in the art, without departing from the spirit of the invention.

What is claimed is:

1. A modular strap comprising:
a first strap for a first wiring module having outwardly projecting ribs on side surfaces;
a second strap for a second wiring module having outwardly projecting ribs on side surfaces coupled to said first strap with a frangible member wherein said first strap can be separated from said second strap by bending or cutting;
a first rectangular opening having two side edges located in said first strap;
a second rectangular opening having two side edges located in said second strap;
said first strap having at least four projections separated by recesses located in said side edges of said first rectangular opening wherein at least two of said recesses receive said outwardly projecting ribs of said first wiring modular; and
said second strap having at least four projections separated by recesses located in said side edges of said second rectangular opening wherein at least two of said recesses receive said outwardly projecting ribs of said second wiring modular.

2. The modular strap of claim 1 further comprising:
first and second flanges located at opposite ends of said first strap, said flanges having apertures for receiving fastening means for coupling said first strap to a wall box; and
first and second flanges located at opposite ends of said second strap, said flanges having apertures for receiving fastening means for coupling said second strap to another wall box.

3. The modular strap of claim 2 wherein
said first and second flanges of said first strap have second apertures for receiving fastening means for coupling a wall plate to said first strap; and
said first and second flanges of said second strap have second apertures for receiving fastening means for coupling a wall plate to said second strap.

4. The modular strap of claim 1 wherein said first strap is separated from said second strap by breaking said frangible member to provide a single strap for coupling at least one wiring module to a single wall box.

5. The modular strap of claim 1 wherein said frangible member coupling said first and second straps is not broken to provide a gang of at least two connected straps for coupling at least one wiring module in each strap of said gang to a gang of at least two wall boxes.

6. The modular strap of claim 1 wherein said first and second straps are composed of polymer material.

7. The modular strap of claim 6 wherein said polymer material is rigid.

8. The modular strap of claim 6 wherein said polymer material is semi-rigid.

* * * * *

UNITED STATES PATENT AND TRADEMARK OFFICE
CERTIFICATE OF CORRECTION

PATENT NO. : 7,211,727 B2
APPLICATION NO. : 11/313736
DATED : May 1, 2007
INVENTOR(S) : James N. Pearse and Paul Kadar It is certified that error appears in the above-identified patent and that said Letters Patent is hereby corrected as shown below:

Title Page,
Item [73], Assignee, add --Leviton Manufacturing Co., Inc., Little Neck, N.Y.--

Signed and Sealed this

Twenty-ninth Day of July, 2008

JON W. DUDAS
*Director of the United States Patent and Trademark Office*